United States Patent [19]

Leigh et al.

[11] Patent Number: 4,807,501
[45] Date of Patent: Feb. 28, 1989

[54] CUTTING TOOL HAVING POSITIONING MEANS

[75] Inventors: Gary G. Leigh; James F. Schwab, both of Wilmington, Ohio

[73] Assignee: Cincinnati Milacron Inc., Cincinnati, Ohio

[21] Appl. No.: 31,977

[22] Filed: Mar. 30, 1987

[51] Int. Cl.⁴ ............................................. B23B 23/00
[52] U.S. Cl. ...................................... 82/31; 82/21 A; 82/27; 51/165.85
[58] Field of Search ................. 82/31, 14 A, 21 A, 27, 82/36 A, 36 R, DIG. 4, 2 R, 21 R; 51/165.9, 165.85, 165 R, 165.77, 165.8, 165.85

[56] References Cited

U.S. PATENT DOCUMENTS

| | | | |
|---|---|---|---|
| 2,493,475 | 1/1950 | Casella | 82/31 |
| 3,585,759 | 6/1971 | Andreson | 51/165.85 |
| 3,858,053 | 12/1974 | Burnett | 82/21 A |
| 3,919,614 | 11/1975 | Wespi | 51/165.77 |
| 3,921,479 | 11/1975 | Katz | 82/21 A |
| 4,099,432 | 7/1978 | Champeau | 82/14 A |
| 4,621,551 | 11/1986 | Silverman | 82/31 |
| 4,669,359 | 6/1987 | Shiba | 82/27 |

Primary Examiner—Frederick R. Schmidt
Assistant Examiner—Blynn Shideler
Attorney, Agent, or Firm—Thomas M. Farrell; Frank C. Leach

[57] ABSTRACT

A tailstock body of a numerically controlled lathe is positioned by a hydraulic rotary motor at a desired position to have a quill center of the tailstock body engage one end of a part or workpiece. The positioning of the tailstock body is by a programmable controller of a numerical control receiving signals for an encoder attached to the hydraulic rotary motor.

15 Claims, 5 Drawing Sheets

CUTTING TOOL HAVING POSITIONING MEANS

This invention relates to a cutting tool having centering means automatically positioned at a desired position and, more particularly, to a numerically controlled cutting tool having centering means positioned by a hydraulic motor under the control of a programmable controller.

In a cutting tool such as a numerically controlled lathe, for example, a part or workpiece is gripped at one end by jaws of a chuck or the like and has its other end supported on a center of a quill of a tailstock body. The quill is supported for sliding movement relative to the tailstock body to enable the center to engage one end of the part. The quill supports the center of the part as the part is rotated by drive means rotating the chuck.

There can be cutting of the part by either one cutting means or two cutting means. Each of the cutting means is movable along two axes so that there are four axes if there are two cutting means. Each of the cutting means is movable along one axis parallel to the longitudinal axis passing through the centers of the quill center and the chuck, i.e., in an axial direction. There also is movement of each of the cutting means perpendicular to the longitudinal axis extending between the centers of the quill center and the chuck, i.e., in a radial direction.

In a numerically controlled lathe, each of the cutting means has each of its movements controlled by a programmable controller of a numerical control. However, the movement of the tailstock body to position the quill has been accomplished by at least two different means.

One means has been to use a full servo positioning axis drive to position the tailstock body at a desired position. However, this servo axis drive is relatively expensive. While the servo axis drive positions the tailstock body within tenths of a thousandth of an inch in the same manner that other servo positioning axis drives move the cutting means along each of the axes, this precise positioning is not necessary for positioning the tailstock body. This is because the quill, which has its center engage the end of the part, is slidably movable within the tailstock body so as to extend different distances from the tailstock body whereby precise positioning to tenths of a thousandth of an inch is not necessary for the tailstock body. It is only necessary that the tailstock body be positioned within approximately 0.030" of a specific position. This variation is compensated through the distance that the slidably movable quill is extended from the tailstock body.

Another means for positioning the tailstock body has been to connect the tailstock body to a cross slide of one of the cutting means and move the cross slide and its carriage on which the cross slide is mounted towards or away from the chuck so that the tailstock body is moved to a desired position. However, this towing arrangement of the tailstock body substantially increases the time for completing the entire processing of each part. That is, since the cutting operations require less than half of the time of the entire process with loading and unloading of the part requiring the remainder of the time for each part from the time that the part is loaded until it is unloaded, the increase in the loading and unloading time through having to connect the tailstock body to the cross slide, either manually or automatically, substantially increases the time of the entire process.

The present invention overcomes the difficulties of the previously available means for positioning the tailstock body through employing a programmable controller, which already is utilized in controlling the cutting means during the cutting operations, to control a hydraulic rotary motor for positioning the tailstock body using a hydraulic supply already available on the cutting tool. The hydraulic motor is significantly less expensive than a DC servo motor, which is utilized with a full servo positioning axis drive. Thus, the much quicker movement previously obtained by the full servo positioning axis drive for the tailstock body in comparison with towing the tailstock body is obtained with the present invention without the relatively expensive motor and drive.

At the same time, the present invention requires much less time than the previously low cost arrangement of towing the tailstock body through connecting it to the cross slide. Accordingly, the present invention has the low cost advantage of the previous towing arrangement while having the short time period for positioning the tailstock body of the previous full servo positioning axis drive.

The present invention controls the position of the hydraulic rotary motor through the programmable controller controlling a three-way solenoid valve to determine the direction of rotation of the hydraulic rotary motor. The programmable controller receives feedback signals from a Gray code pattern encoder, which produces the signals in accordance with the position of the hydraulic rotary motor, to control the position of the tailstock body. The tailstock body is connected to the hydraulic rotary motor through a ball screw. Because of the need to only position the tailstock body within 0.030", the Gray code pattern signals from the encoder will be sufficient to enable positioning of the tailstock body within this range.

An object of this invention is to provide a cutting tool having a unique apparatus for positioning part centering means.

Another object of this invention is to provide a relatively low cost apparatus for positioning part centering means of a cutting tool.

Other objects of this invention will be readily perceived from the following description, claims, and drawings.

This invention relates to a cutting tool for performing at least one cutting operation on a part including means engageable with one end of a part to rotate the part and centering means engageable with the other end of the part to maintain the part aligned on a desired axis during its rotation. At least one cutting operation is performed on the part by cutting means. The centering means is moved along a predetermined axis by moving means, which includes a hydraulic rotary motor and means to convert the rotation of the hydraulic rotary motor into linear motion of the centering means. Control means controls the direction of rotation of the hydraulic rotary motor for determining the direction of movement of the centering means along the predetermined axis. The hydraulic rotary motor is stopped by stopping means when the centering means is at a desired position.

The attached drawings illustrate a preferred embodiment of the invention, in which.

Figure 1:
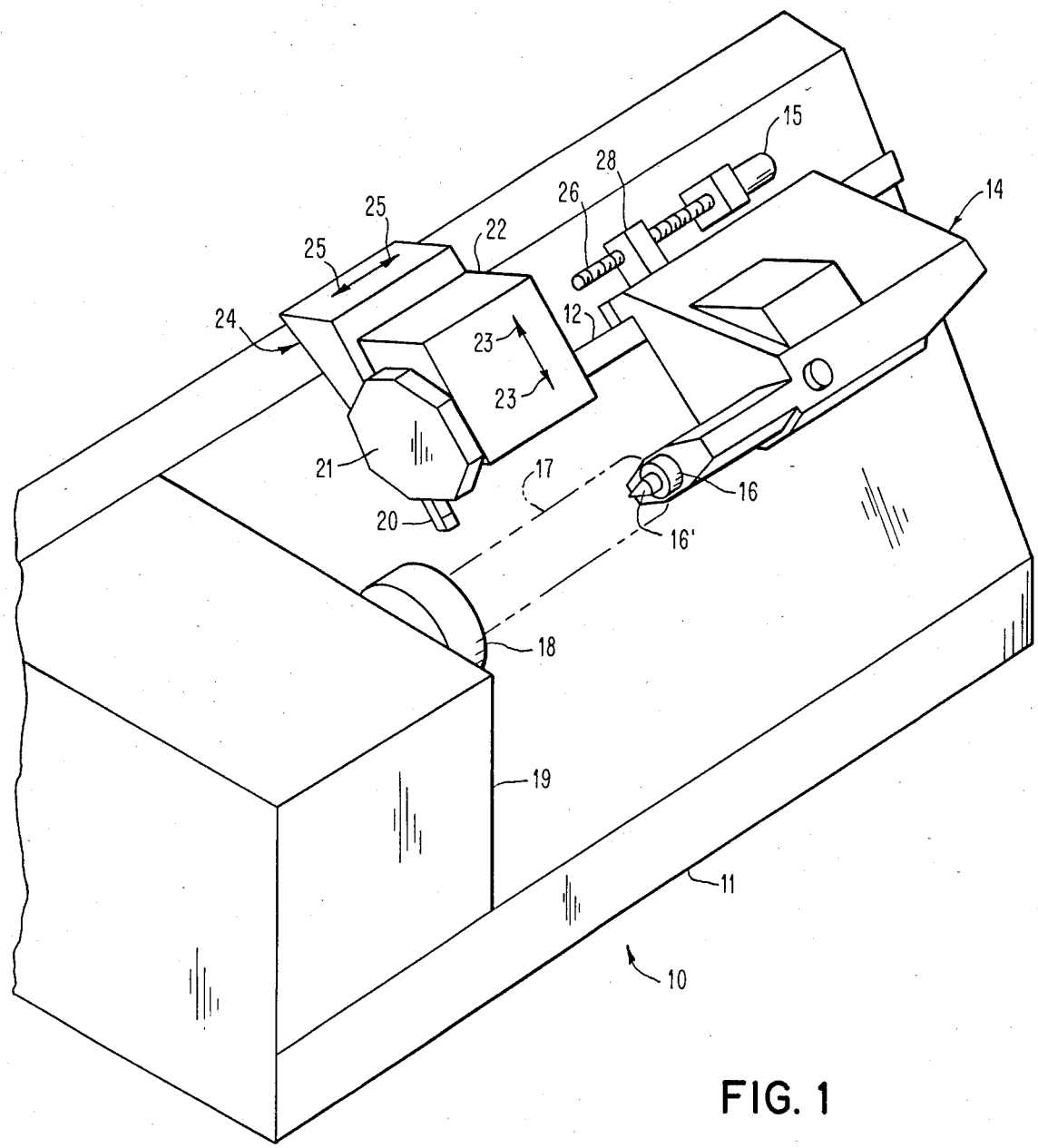
FIG. 1 is a schematic perspective view of a numerically controlled cutting tool having an apparatus for positioning at a desired position means for centering a part.

Referring to the drawings and particularly FIG. 1, there is shown a cutting tool such as a numerically controlled lathe 10. The lathe 10 includes a bed 11 having a pair of substantially parallel ways 12 and 13 (see FIG. 3) mounted thereon. A tailstock body 14 (see FIG. 1) is moved along the ways 12 and 13, (see FIG. 3) by a hydraulic rotary motor 15 (see FIG. 1).

The tailstock body 14 has a quill 16 slidably supported therein for relatively longitudinal or linear movement with respect to the tailstock body 14 as more particularly shown and described in the copending application of Gary G. Leigh et al. for "Cutting Tool Having An Intensifier," Ser. No. 31,978, filed Mar. 30, 1987, now U.S. Pat. No. 4,751,864, and assigned to the same assignee as the assignee of this application. The aforesaid Leigh et al application is incorporated by reference herein. The quill 16 rotatably supports a center 16' although the center 16' does not have to be rotatable.

The center 16' of the quill 16 engages one end of a part or workpiece 17 (shown in phantom) through being disposed in a hole in the part 17 that is center drilled prior to the part 17 being positioned for engagement by the center 16'. The other end of the part 17 is supported in jaws 17' (see FIG. 8) of a chuck 18, which is rotatably mounted in a headstock 19 and rotated by suitable driving means (not shown) in the well-known manner.

The part 17 has cutting operations performed on it by one or more cutting elements 20 (see FIG. 1), which are mounted in a numerically controlled turret 21. The turret 21 is rotatably supported on a cross slide 22 to position a different one of the cutting elements 20 in position for performing a cutting operation on the part 17. The cross slide 22 moves along an axis in the directions indicated by arrows 23. The cross slide 22 is driven by a DC servo drive in the well-known manner.

The cross slide 22 is movable relative to a carriage 24 on which it is mounted. The carriage 24 moves along an axis in the directs indicated by arrows 25 and is driven by a DC servo drive in the well-known manner. Thus, there is movement along two different axes with the carriage 24 producing motion along a first axis and the cross slide 22 producing motion along a second axis, which is substantially orthogonal to the first axis.

The tailstock body 14 is moved to a desired position by the hydraulic rotary motor 15 through a ball screw 26 cooperating with a ball nut 27 (see FIG. 3) mounted in a bracket 28 on the tailstock body 14. This enables rotary motion of the ball screw 26 by the hydraulic rotary motor 15 to be changed to linear motion of the tailstock body 14.

The direction of rotation of the hydraulic rotary motor 15 is controlled by a three-way solenoid valve 29. One suitable example of the solenoid valve 29 is sold by Parker-Hannifin Corporation as model No. D1VW1CY. Hydraulic fluid is supplied to the hydraulic motor 15 through the solenoid valve 29 from a hydraulic source 30 having a pressure of 600 p.s.i.

Figure 3:
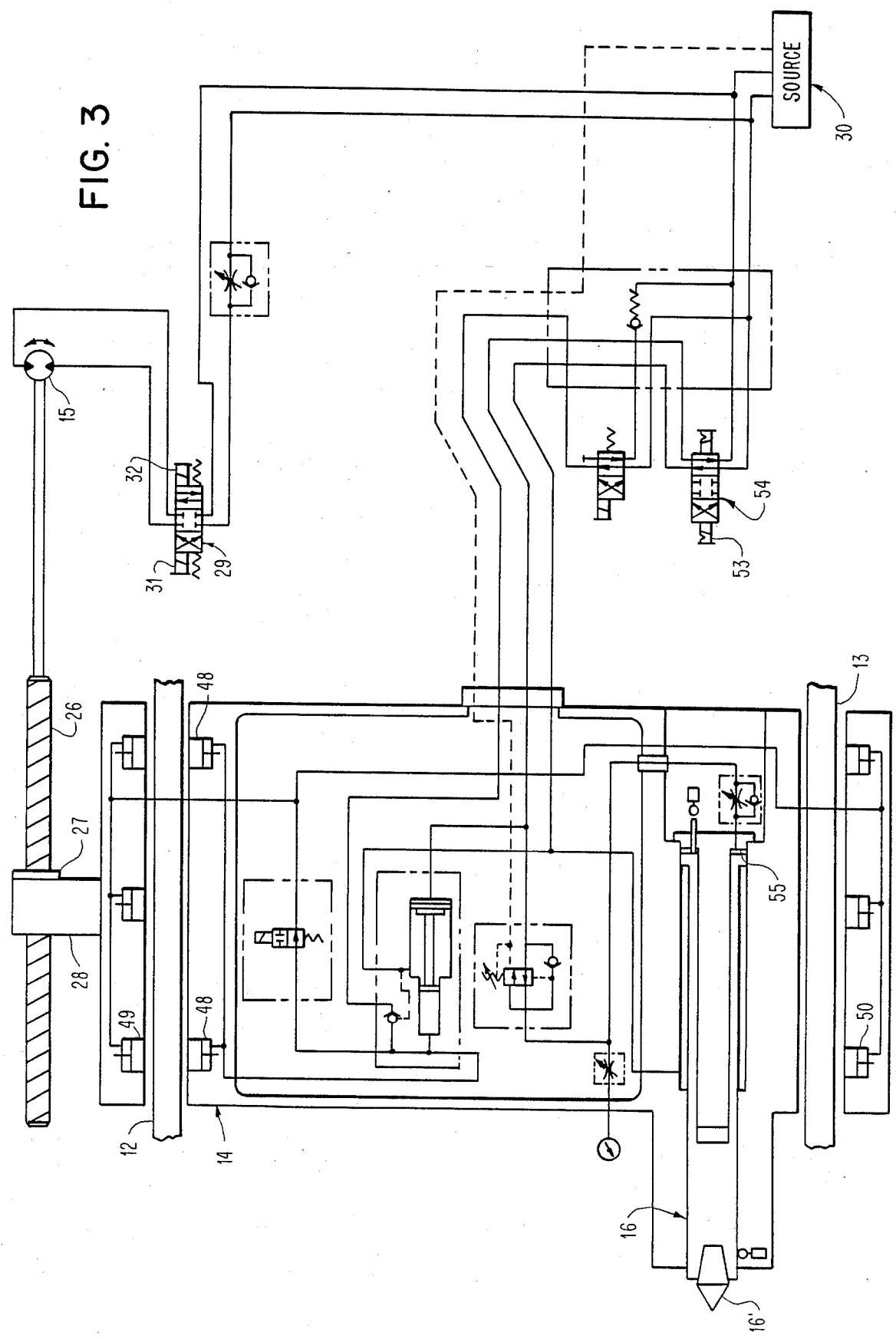
FIG. 3 is a schematic view of the hydraulic arrangement for controlling the hydraulic rotary motor for positioning the centering means.

The position of the solenoid valve 29 in FIG. 3 is its inactive position in which each of solenoids 31 and 32 is deenergized. The energization of the solenoid 31 shifts the solenoid valve 29 so that the hydraulic pressure from the hydraulic source 30 causes the hydraulic rotary motor 15 to rotate in a direction in which the tailstock body 14 is advanced towards the chuck 18 (see FIG. 1). When the solenoid 32 (see FIG. 3) is energized, the solenoid valve 29 shifts to a position in which the hydraulic rotary motor 15 is rotated in a direction to retract the tailstock body 14 away from the chuck 18 (see FIG. 1).

The solenoids 31 (see FIG. 3) and 32 are controlled from a programmable controller 33 (see FIG. 2) of a numerical control 34 sold by Fanuc Ltd. of Hino, Japan as model 11-TT. The numerical control 34 also is employed to control the operation of the carriage 24 (see FIG. 1) and the cross slide 22. The programmable controller 33 (see FIG. 2) also is utilized to control the turret 21 (see FIG. 1) as well as other mechanisms on the lathe 10.

Figure 5:
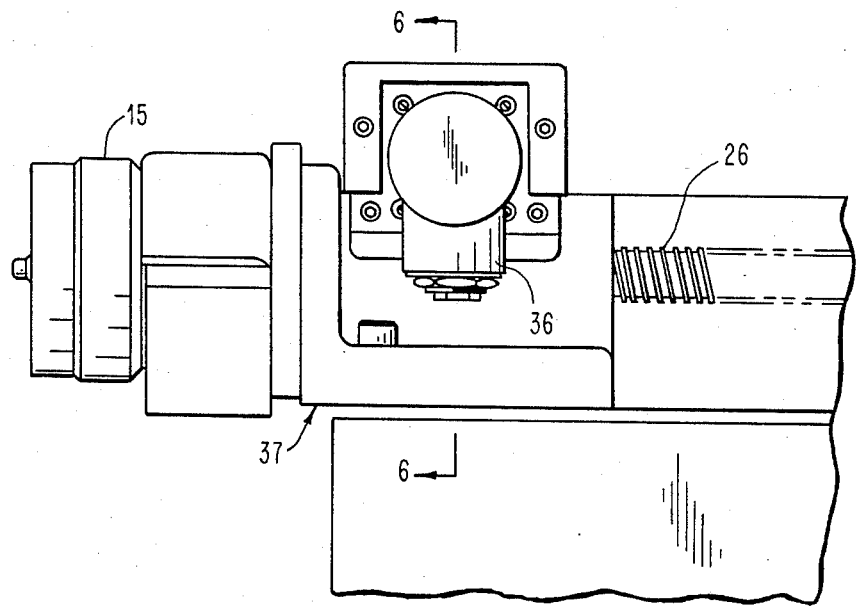
FIG. 5 is a fragmentary elevational view of the ball screw, the hydraulic rotary motor, and the encoder.

The programmable controller 33 (see FIG. 2) receives signals over a data bus line 35 from a Gray code pattern encoder 36 which is driven from the hydraulic rotary motor 15. The hydraulic rotary motor 15 is supported on the bed 11 (see FIG. 1) by an L-shaped mount 37 (see FIG. 5), which also supports the encoder 6. One suitable example of the encoder 36 is an absolute position optical encoder sold by BEI, Santa Barbara, Calif. as model T25E-X-HSS-1024-G-X-D4-X-S-C14-X-5.

Figure 4:
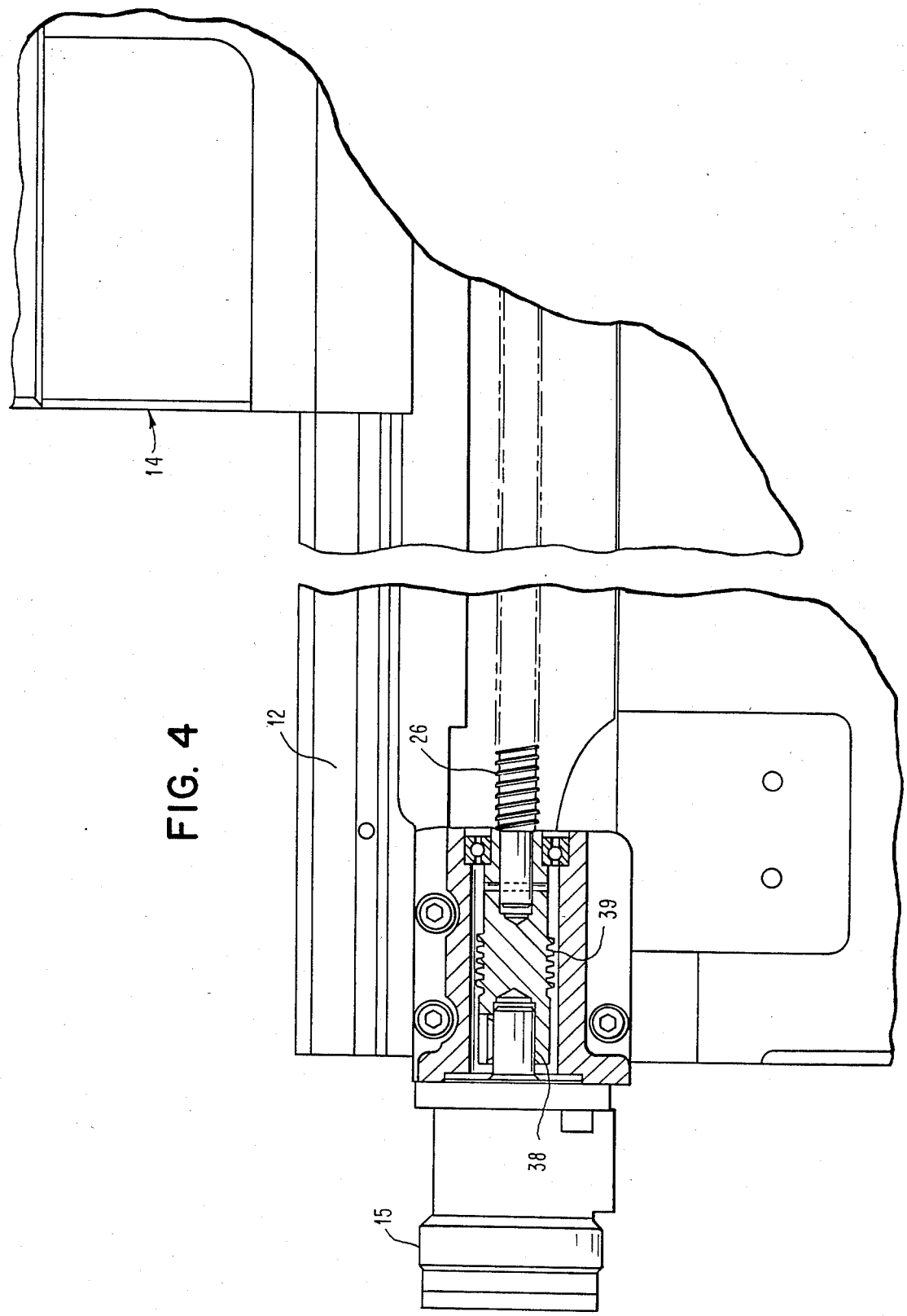
FIG. 4 is a fragmentary view, partly in section, of the tailstock body, the ball screw, and the hydraulic rotary motor.
Figure 6:
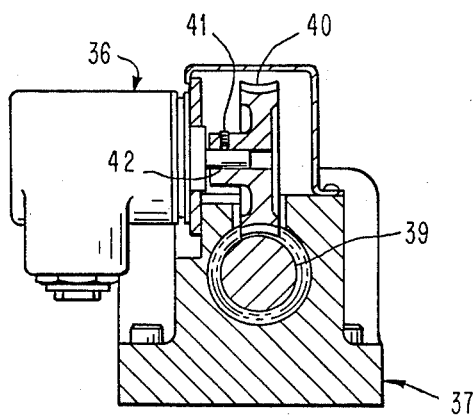
FIG. 6 is a sectional view of a portion of the ball screw and encoder of FIG. 5 and taken along line 6—6 of FIG. 5.

As shown in FIG. 4, the hydraulic rotary motor 15 has its output shaft 38 keyed to a worm 39, which has the ball screw 26 connected thereto. The worm 39 drives a worm wheel 40 (see FIG. 6), which is coupled by a set screw 41 to a shaft 42 of the encoder 36.

Figure 2:
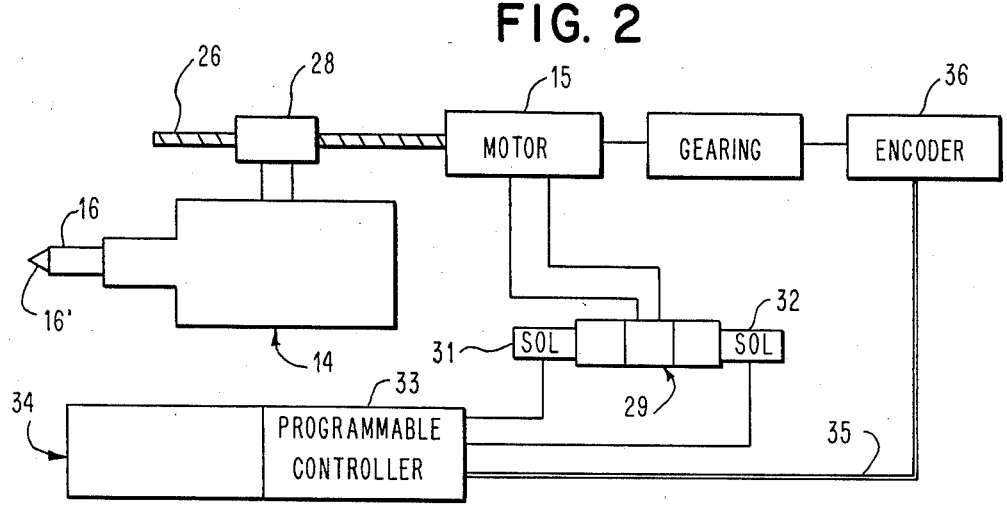
FIG. 2 is a schematic view of the apparatus for positioning the centering means.

The shaft 42 of the encoder 36 has an encoder wheel (not shown) mounted thereon for rotation therewith and providing a signal for each 1/16" of axial or linear travel of the ball screw 26 (see FIG. 2). With the tailstock body 14 traveling 30.53", there is a total of 488 positions of the encoder wheel for which different Gray code pattern signals are supplied from the encoder 36. The encoder wheel revolves less than one total revolution for this axial or linear travel of 30.53" of the tailstock body 14.

Figure 7:
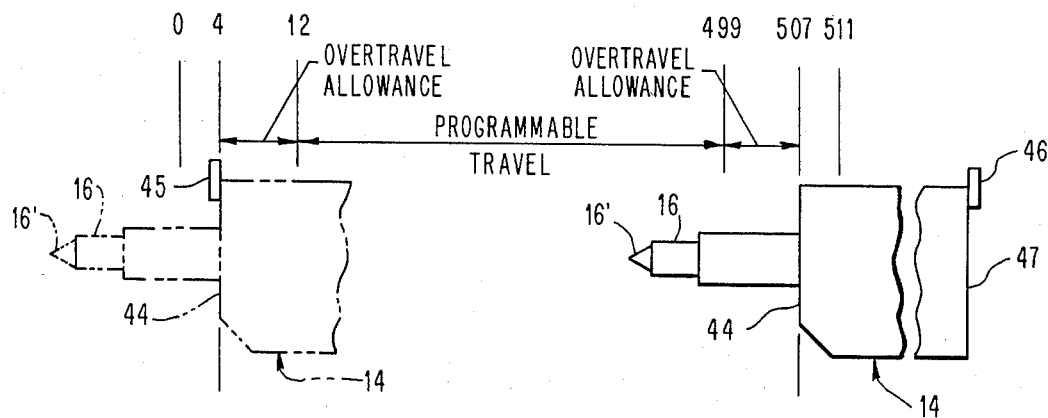
FIG. 7 is a schematic view showing equivalent decimal conversions of the various Gray code pattern numbers produced by the encoder for positions of the tailstock body.

As shown in FIG. 7, the programmable travel of 30.53" of the tailstock body 14 utilizes bit values 12–499 of the Gray code pattern produced by the encoder 36 (see FIG. 2) for transmission as signals to the programmable controller 33. As shown in FIG. 7, there is an overtravel allowance of Gray code pattern numbers 4–12 and 499–507 at opposite ends of the travel of the tailstock body 14.

The Gray code pattern number 4 from the encoder 36 (see FIG. 6) occurs when the tailstock body 14 (see FIG. 7) has its front face or edge 44 engaging a minus positive stop 45, which is a fixed portion of the bed 11 (see FIG. 1), at the most advanced position of the tailstock body 14 as shown in phantom in FIG. 7. As shown in FIG. 7, the Gray code pattern numbers 0-3 are beyond the minus positive stop 45.

Gray code pattern numbers 508-511 are beyond a plus positive stop 46, which is a fixed portion of the bed 11 (see FIG. 1). When the tailstock body 14 has its rear face or edge 47 (see FIG. 7) engaging the plus positive stop 46, the front face 44 of the tailstock body 14 is at the position of the Gray code pattern number 507 from the encoder 36 (see FIG. 6).

The encoder 36 is normally set up with the tailstock body 14 (see FIG. 7) having its front face or edge 44 at the minus positive stop 45. At this time, the set screw 41 (see FIG. 6) is loosened so that the shaft 42 of the encoder 36 is not coupled to the worm 39 whereby the encoder wheel (not shown) is rotated until the absolute feedback position from the encoder 36 to the programmable controller 33 (see FIG. 2) is the nominal desired value (Gray code pattern number 4) or close to it.

Then, the set screw 41 (see FIG. 6) is tightened. If the exact absolute position equivalent to the nominal desired value (Gray code pattern number 4) is not attained, the difference between the actual and nominal values is an encoder adjustment error that is stored in the programmable controller 33 (see FIG. 2). Thus, the programmable controller 33 knows the value when the front face or edge 44 (see FIG. 7) of the tailstock body 14 is at the minus positive stop 45.

The tailstock body 14 can be advanced either automatically or manually in either direction. When automatically positioning the tailstock body 14, the supply of the hydraulic fluid to the hydraulic rotary motor 15 (see FIG. 2) is stopped prior to the desired position at which the tailstock body 14 is to be disposed. This is because of the time lag to send a signal from the encoder 36 through the programmable controller 33 to the solenoid 31 or 32 of the solenoid valve 29 to stop the flow of hydraulic fluid to the hydraulic rotary motor 15.

In either automatic or manual positioning of the tailstock body 14, the tailstock body 14 must be first unclamped from the bed 11 (see FIG. 1) and the ways 12 and 13 (see FIG. 3) through removing hydraulic pressure from a first set of pucks 48 clamping against the bed 11 (see FIG. 1), a second set of pucks 49 (see FIG. 3) clamping against the way 12, and a third set of pucks 50 clamping against the way 13.

It also is necessary to clamp the tailstock body 14 to the bed 11 (see FIG. 1) and the ways 12 and 13 (see FIG. 3) after the tailstock body 14 is at the desired position. This is accomplished through first supplying hydraulic fluid to the first set of pucks 48 and after a delay to the second set of pucks 49 and the third set of pucks 50. This is specifically shown and described in the aforesaid Leigh et al application.

Automatic positioning of the tailstock body 14 (see FIG. 2) is accomplished by a part program through an M-code and a B-code within the programmable controller 33. The M-code is M84 which is the tailstock position command. The B-code is Bxxxx where each x is a numeral from 0 to 9 and Bxxxx is the dimensional information on where to position the tailstock body 14. By using the tailstock position command (M84), the B-code may be utilized with other M codes for usage for other mechanisms in conjunction with the numerically controlled lathe 10 (see FIG. 1).

Figure 8:
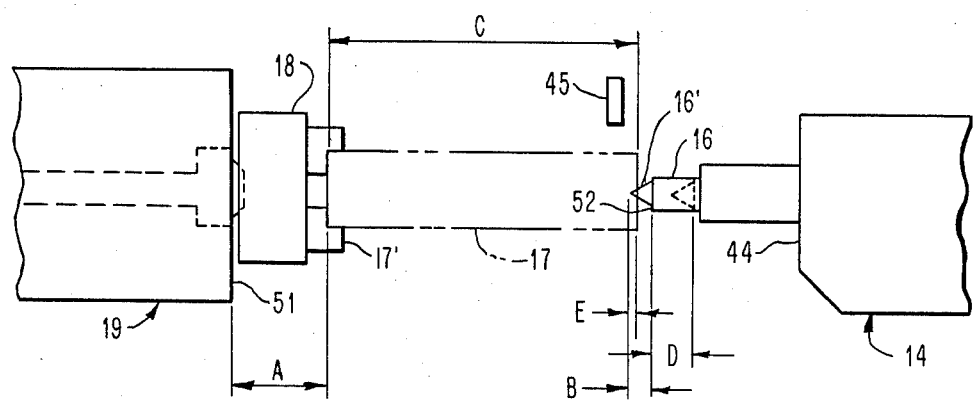
FIG. 8 is a schematic view showing dimensions used in determining the B-code value.

The B-code for the dimensional information on where to position the tailstock body 14 is related to the length of the part 17 and the extension of the quill 16 from the tailstock body 14. Thus, Bxxxx=A+B+C+D−E (Each of the dimensions A to E is shown in FIG. 8.) where A is the distance from a face 51 of the headstock 19 to the start of the part 17, B is the distance from a face 52 of the quill 16 to the extreme point of the center 16' of the quill 16, C is the length of the part 17, D is the desired extension of the quill 16, and E is the distance that the center 16' extends into the part 17.

The distances A and B are constants based upon a particular chuck, jaw configuration of the chuck, and the particular quill center being employed. The distance E is a relatively small distance, usually a constant, that the end of the part 17 is center drilled prior to machining.

There is a minimum length of the part 17 that can be supported when the tailstock body 14 is positioned at its minimum travel position and the quill 16 is fully extended. For this minimum length of the part 17, one example of Bxxx would be with A=9.16, B=1.50, C=5.00, D=8.62, and E=0.25 whereby Bxxx=24.03 inches. Shifting the decimal point so that Bxxx has the proper format, Bxxxx=2403 for the minimum length of the part 17 of five inches.

With the programmable travel of 30.53 inches of the tailstock body 14 as previously discussed, the maximum length of the part 17 with the quill 16 fully extended results in Bxxxx=54.56 inches. This is obtained by adding 24.03 inches for the minimum length of the part 17 and 30.53 inches for the programmable travel of the tailstock body 14. Thus, for the maximum length of the part 17, Bxxxx=5456.

Therefore, the B-code can range from 2403 to 5456. However, as previously discussed and shown in FIG. 7, the bit values of the encoder 36 (see FIG. 2) can range from 12 to 499.

Accordingly, it is necessary to offset the B-code so that its starting bit value or number is proportional to the staring bit value or number of the encoder 36. This is accomplished by subtracting a constant, A2, from Bxxxx. The constant A2 is the distance from the face 51 (see FIG. 8) of the headstock 19 to the face 52 of the fully retracted quill 16 when the front face 44 of the tailstock body 14 is engaging the minus positive stop 45. This subtraction of the constant A2 from Bxxxx produces a B-code value that has its starting bit value or number proportional to the starting bit value or number of the encoder 36 (see FIG. 2).

The constant A2 is data that is remembered during the time that the programmable controller 33 is off. After the constant A2 is subtracted from Bxxxx, the resultant value must be scaled by suitable multiplier and divider constants to produce a numerical bit value range corresponding to the numerical bit value range of the encoder 36.

Software within the programmable controller 33 accomplishes the desired automatic positioning of the tailstock body 14 in the following steps:

1. Wait for the M84 code from the part program. When M84 command received, continue with Steps 2, 3, and 4 checking the B-code for validity.

2. Cause error message and stop automatic cycle if B-code is not contained in the same part program block; otherwise, continue.

3. Subtract the constant A2 from the B-code. As previously set forth, the constant A2 is data that is remembered during the time that the programmable controller 33 is off.

4. Cause error if the result of Step 3 is greater than a maximum value (data) or less than a minimum value (data); otherwise, continue.

5. Convert the number in Step 3 by using suitable multiplier and divider constants to a binary number for comparison with the actual position of the encoder wheel (not shown) of the encoder 36. Add or subtract, if necessary, the encoder adjustment error. The resulting value is called Commanded Position.

6. Compare the Commanded Position with the actual position as provided by the feedback signal from the encoder 36.
   A. If the Commanded Position is within the absolute position plus or minus a small amount, the tailstock body 14 is at the desired position so that no movement is necessary. End. Go to Step 13.
   B. Otherwise, if the Commanded Position is greater than the actual position, then tailstock plus motion is required.
   C. Otherwise, tailstock minus motion is required.

7. If the tailstock plus motion is required, subtract the look ahead value (data) from the Commanded Position. If tailstock minus motion is required, add the look ahead value (data) to the Commanded Position. This resulting value is called the stopping point and accounts for the amount of travel coast of the tailstock body 14 occurring after the hydraulic rotary motor 15 is turned off before friction can bring the tailstock body 14 to a complete stop.

8. Unclamp the tailstock body 14 from the ways 12 and 13 (see FIG. 3) and wait for the fully unclamped state.

9. If tailstock plus motion is required, energize the solenoid 31. If tailstock minus motion is required, energize the solenoid 32. The tailstock body 14 is now moving.

10. Continuously compare the Gray code pattern feedback signal from the encoder 36 (see FIG. 2), which is the actual position of the tailstock body 14, converted to binary, with the stopping point, which has been defined in Step 7. If tailstock plus motion and the actual position are greater or equal to the stopping point, the solenoid 31 is deenergized. If tailstock minus motion and the actual position are less than or equal to the stopping point, the solenoid 32 is turned off.

11. Clamp the tailstock body 14 to the ways 12 (see FIG. 3) and 13 and the bed 11 (see FIG. 1). Wait for the fully clamped state.

12. Compare the actual position of the tailstock body 14 (This is the binary conversion of the feedback signal from the encoder 36 (see FIG. 2).) with the Commanded Position. If the values are not within a suitable range, a positioning error message is caused, and the automatic cycle is stopped. Otherwise, continue.

13. Successful completion of positioning of the tailstock body 14 by automatic cycle M84 and Bxxxx codes. Manual positioning of the tailstock body 14 occurs by a user depressing a "tailstock minus" push button or a "tailstock plus" push button. A sequence similar to the automatic positioning is executed with the following exceptions to the steps of the automatic positioning:

1. Wait for "tailstock minus" push button or "tailstock plus" push button.

2, 3, and 4. There is no checking of the B-code validity as is accomplished by Steps 2–4 of the automatic positioning sequence. If the "tailstock plus" push button has been depressed, a pseudo B-code equal to the plus limit is entered. If the "tailstock minus" push button is depressed, a pseudo B-code equal to the minus limit is entered.

10. In addition to waiting for the comparison to be fulfilled (The tailstock body 14 would have been moved to the plus or minus limit.), wait for the operator to release the activated push button. When either of these wait conditions occurs, the activated solenoid 31 or 32 is deenergized.

12. Omitted. The comparison is not performed.

Accordingly, the tailstock body 14 is manually positioned to a location as commanded by an operator depressing the "tailstock plus" push button or the "tailstock minus" push button and then the timely release thereof.

After the tailstock body 14 is disposed at the desired position, it is locked to the bed 11 (see FIG. 1) and the ways 12 and 13 (see FIG. 3). Then, the quill 16 is advanced from the tailstock body 14 as shown and described in the aforesaid Leigh et al application. This includes activating a solenoid 53 of a directional control valve 54 to allow fluid to flow from the hydraulic source 30 to a chamber 55 in the tailstock body 14.

An advantage of this invention is that it avoids the necessity of connecting and disconnecting a tailstock body to a cross slide of cutting means for positioning the tailstock body. Another advantage of this invention is that it avoids the requirement of a DC servo drive while still obtaining the same quick movement of a tailstock body to a desired position. A further advantage of this invention is its relatively low cost in comparison with a DC servo drive while still having the quick positioning of a tailstock body. Still another advantage of this invention is that precise positioning of a tailstock body is not required while the tailstock body is still positioned to enable a quill center of the tailstock body to engage and hold a part.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A cutting tool for performing at least one cutting operation on a part including:
   means engageable with one end of a part to rotate the part;
   a tailstock body mounted for linear motion along a predetermined axis;
   a quill slidably supported in aid tailstock body for longitudinal movement relative to said tailstock body and parallel to the predetermined axis;
   said quill having support means engageable with the other end of the part to maintain the part aligned on a desired axis during its rotation;
   cutting means for performing at least one cutting operation on the part;
   moving means for moving said tailstock body along the predetermined axis;
   said moving means including: a hydraulic rotary motor; and means to convert the rotation of said hydraulic rotary motor into linear motion of said tailstock body along the predetermined axis;
   said converting means including means connected to said hydraulic rotary motor and said tailstock body to convert the rotation of said hydraulic rotary motor into linear motion of said tailstock body along the predetermined axis;

control means to control the direction of rotation of said hydraulic rotary motor for determining the direction of movement of said tailstock body along the predetermined axis;

stopping means to stop said hydraulic rotary motor when said tailstock body is at a predetermined distance prior to a desired position whereby said tailstock body stops at the desired position without any reversing of the direction of rotation of said hydraulic rotary motor during movement of said tailstock body to the desired position;

locking means to lock said tailstock body at the desired position;

and quill moving means to move said quill longitudinally relative to said tailstock body and parallel to the predetermined axis to enable said support means of said quill to engage the other end of the part after said locking means has locked said tailstock body at the desired position, said quill moving means being separate from said hydraulic rotary motor.

2. The cutting tool according to claim 1 in which said stopping means includes: p1 sensing means to sense the rotary position of said hydraulic rotary motor;

and means to receive from said sensing means the rotary position of said hydraulic rotary motor, said receiving means causing said hydraulic rotary motor to stop when said hydraulic rotary motor is at a rotary position corresponding to said tailstock body being the predetermined distance prior to the desired position of said tailstock body along the predetermined axis.

3. The cutting tool according to claim 2 in which:
said sensing means includes encoder means;
and said receiving means includes programmable controller means receiving signals from said encoder means indicating the rotary position of said hydraulic rotary motor.

4. The cutting tool according to claim 3 in which:
said control means includes directional control means to control the direction of flow of hydraulic fluid to said hydraulic rotary motor;
and said programmable controller means controls said directional control means.

5. The cutting tool according to claim 3 in which said control means includes a three-way valve having its positions controlled by said programmable controller means, said three-way valve allowing flow of hydraulic fluid to said hydraulic rotary motor to cause rotation of said hydraulic rotary motor in one direction when said three-way valve is in a first position, allowing flow of hydraulic fluid to said hydraulic rotary motor to cause rotation of said hydraulic rotary motor in the opposite direction when said three-way valve is in a second position, and stopping flow of hydraulic fluid to said hydraulic rotary motor when said three-way valve is in a third position.

6. A cutting tool for performing at least one cutting operation on a part including:
means engageable with one end of a part to rotate the part; fixed means;
first means slidably mounted on said fixed means for linear motion along a predetermined axis;
a quill slidably mounted on said first means for longitudinal movement relative to said first means and parallel to the predetermined axis;

said quill having support means for engaging the other end of the part to rotatably support the other end of the part to maintain the part aligned on a desired axis during its rotation;

cutting means for performing at least one cutting operation on the part;

moving means for moving said first means along the predetermined axis;

said moving means including:
a hydraulic rotary motor;
and means to convert the rotation of said hydraulic rotary motor into linear motion of said first means;

said converting means including means connected to said hydraulic rotary motor and said first means to convert the rotation of said hydraulic rotary motor into linear motion of said first means relative to said fixed means along the predetermined axis;

control means to control the direction of rotation of said hydraulic rotary motor for determining the direction of movement of said first means along the predetermined axis;

stopping means to stop said hydraulic rotary motor when said first means is at a predetermined distance prior to a desired position whereby said first means stops at the desired position without any reversing of the direction of rotation of said hydraulic rotary motor during movement of said first means to the desired position;

locking means to lock said first means at the desired position;

and quill moving means to move said quill longitudinally relative to said first means to enable said support means to engage the other end of the part after said locking means has locked said first means at the desired position, said quill moving means being separate from said hydraulic rotary motor.

7. The cutting tool according to claim 6 in which said stopping means includes:
sensing means to sense the rotary position of said hydraulic rotary motor;
and means to receive from said sensing means the rotary position of said hydraulic rotary motor, said receiving means causing said hydraulic rotary motor to stop when said hydraulic rotary motor is at a rotary position corresponding to said first means being the predetermined distance prior to the desired position of said first means along the predetermined axis.

8. The cutting tool according to claim 7 in which:
said sensing means includes encoder means;
and said receiving means includes programmable controller means receiving signals from said encoder means indicating the rotary position of said hydraulic rotary motor.

9. The cutting tool according to claim 8 in which:
said control means includes directional control means to control the direction of flow of hydraulic fluid to said hydraulic rotary motor;
and said programmable controller means controls said directional control means.

10. The cutting tool according to claim 8 in which said control means includes a three-way valve having its positions controlled by said programmable controller means, said three-way valve allowing flow of hydraulic fluid to said hydraulic rotary motor to cause rotation of said hydraulic rotary motor in one direction when said three-way valve is in a first position, allowing flow of hydraulic fluid to said hydraulic rotary motor to cause rotation of said hydraulic rotary motor in the opposite direction when said three-way valve is in a second position, and stopping flow of hydraulic fluid to said hydraulic rotary motor when said three-way valve is in a third position.

11. A cutting tool for performing at least one cutting operation on a part including:

means engageable with one end of as part to support the one end of the part;

fixed means;

first means slidably mounted on said fixed means for linear motion along predetermined axis;

a quill slidably mounted on said first means for longitudinally movement relative to said first means and parallel to the predetermined axis;

said quill having support means for engaging the other end of the part to support the other end of the part;

cutting means for performing at least one cutting operation on the part, moving means for moving said first means along the predetermined axis;

said moving means including:

a hydraulic rotary motor;

and means to convert the rotation of said hydraulic rotary motor into linear motion of said first means along the predetermined axis;

said converting means including means connected to said hydraulic rotary motor and said first means to convert the rotation of said hydraulic rotary motor into linear motion of said first means relative to said fixed means along the predetermined axis;

control means to control the direction of rotation of said hydraulic rotary motor for determining the direction of movement of said first means along the predetermined axis;

stopping means is at a predetermined distance when said first means is at a predetermined distance prior to a desired position whereby said first means stops at the desired position without any reversing of the direction of rotation of said hydraulic rotary motor during movement of said first means to the desired position;

locking means to lock said first means at the desired position;

and quill moving means to move said quill longitudinally relative to said first means and parallel to the predetermined axis to enable said support means to engage the other end of the part after said locking means has locked said first means at the desired position, said quill moving means being separate from said hydraulic rotary motor.

12. The cutting tool according to claim 11 in which said stopping means includes:

sensing means to sense the rotary position of said hydraulic rotary motor;

and means to receive from said sensing means the rotary position of said hydraulic rotary motor, said receiving means causing said hydraulic rotary motor to stop when said hydraulic rotary motor is at a rotary position corresponding to said first means being the predetermined distance prior to the desired position of said first means along the predetermined axis.

13. The cutting tool according to claim 12 in which:

said sensing means includes encoder means;

and said receiving means includes programmable controller means receiving signals from said encoder means indicating the rotary position of said hydraulic rotary motor.

14. The cutting tool according to claim 13 in which:

said control means includes directional control means to control the direction of flow of hydraulic fluid to said hydraulic rotary motor;

and said programmable controller means controls said directional control means.

15. The cutting tool according to claim 13 in which said control means includes a three-way valve having its positions controlled by said programmable controller means, said three-way valve allowing flow of hydraulic fluid to said hydraulic rotary motor to cause rotation of said hydraulic rotary motor in one direction when said three-way valve is in a first position, allowing flow of hydraulic fluid to said hydraulic rotary motor to cause rotation of said hydraulic rotary motor in the opposite direction when said three-way valve is in a second position, and stopping flow of hydraulic fluid to said hydraulic rotary motor when said three-way valve is in a third position.

* * * * *